(12) United States Patent
Tatourian et al.

(10) Patent No.: US 11,188,835 B2
(45) Date of Patent: Nov. 30, 2021

(54) OBJECT IDENTIFICATION FOR IMPROVED UX USING IOT NETWORK

(71) Applicant: Intel Corporation, Santa Clara, CA (US)

(72) Inventors: Igor Tatourian, Fountain Hills, AZ (US); Rita H. Wouhaybi, Portland, OR (US); Rajesh Poornachandran, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1137 days.

(21) Appl. No.: 15/396,094

(22) Filed: Dec. 30, 2016

(65) Prior Publication Data

US 2018/0189661 A1    Jul. 5, 2018

(51) Int. Cl.
*G06N 5/04* (2006.01)
*G06N 20/00* (2019.01)
(Continued)

(52) U.S. Cl.
CPC ........... *G06N 5/04* (2013.01); *G06F 21/6245* (2013.01); *G06N 5/022* (2013.01); *G06N 5/025* (2013.01); *G06N 20/00* (2019.01); *H04L 63/0861* (2013.01); *H04L 63/10* (2013.01); *H04L 63/108* (2013.01); *H04L 67/10* (2013.01); *H04W 4/029* (2018.02); *H04W 4/38* (2018.02); *H04W 4/70* (2018.02); *H04W 12/02* (2013.01); *G06F 2221/2111* (2013.01)

(58) Field of Classification Search
CPC ....................................................... G06N 5/04

USPC ............................................................ 706/12
See application file for complete search history.

(56) References Cited

U.S. PATENT DOCUMENTS 6,381,346 B1 *  4/2002  Eraslan .............. G06K 9/00221
                                                                345/420
9,516,470 B1 * 12/2016  Scofield ................... H04W 4/21
(Continued)

OTHER PUBLICATIONS

Layne et al., Person re-identification by attributes. In Bmvc, vol. 2, p. 8, 2012 (Year: 2012).*
(Continued)

*Primary Examiner* — James D. Rutten
(74) *Attorney, Agent, or Firm* — Schwegman Lundberg & Woessner, P.A.

(57) ABSTRACT

In some embodiments, the disclosed subject matter involves a system and method to identify objects in an environment or scene to assist in locating objects and individuals. In at least one embodiment, users register with a service to help locate and/or track objects and individuals. The service may provide recommendations on how to locate, reach, or avoid the target object or individual. Identifying and tracking an object may be used to locate an individual when the object is correlated with the individual. Individuals may register with the service for purposes of user authentication and for defining privacy authorizations for data related to the identifying the user and user's location to other parties. The service may execute in a trusted execution environment to help preserve privacy. Embodiments may be used for games, geo-caching, finding groups and individuals for meeting up, avoiding objects or individuals, etc. Other embodiments are described and claimed.

25 Claims, 5 Drawing Sheets

(51) Int. Cl.
*H04W 4/38* (2018.01)
*H04W 12/02* (2009.01)
*H04W 4/70* (2018.01)
*G06N 5/02* (2006.01)
*H04W 4/029* (2018.01)
*H04L 29/08* (2006.01)
*G06F 21/62* (2013.01)
*H04L 29/06* (2006.01)

(56) References Cited

U.S. PATENT DOCUMENTS

| | | | | |
|---|---|---|---|---|
| 10,380,814 B1* | 8/2019 | Mathiesen | ............ | G07C 9/253 |
| 2007/0037582 A1* | 2/2007 | Mohi | ............ | G01C 21/20 |
| | | | | 455/456.1 |
| 2008/0140650 A1* | 6/2008 | Stackpole | ............ | G06Q 10/10 |
| 2008/0170776 A1* | 7/2008 | Albertson | ............ | G06F 21/35 |
| | | | | 382/154 |
| 2011/0184647 A1* | 7/2011 | Yoel | ............ | G08G 5/0021 |
| | | | | 701/301 |
| 2013/0237204 A1* | 9/2013 | Buck | ............ | H04M 1/72569 |
| | | | | 455/418 |
| 2013/0265178 A1* | 10/2013 | Tengler | ............ | H04W 4/00 |
| | | | | 340/989 |
| 2014/0244344 A1* | 8/2014 | Bilet | ............ | G06Q 10/0635 |
| | | | | 705/7.28 |
| 2014/0294257 A1* | 10/2014 | Tussy | ............ | G06F 21/32 |
| | | | | 382/118 |
| 2015/0022350 A1 | 1/2015 | Hsu | | |
| 2015/0087258 A1* | 3/2015 | Barnes | ............ | H04W 4/90 |
| | | | | 455/404.2 |
| 2015/0281279 A1* | 10/2015 | Smith | ............ | H04L 63/20 |
| | | | | 726/1 |
| 2015/0382139 A1* | 12/2015 | Omar | ............ | G01S 5/0294 |
| | | | | 455/456.1 |
| 2016/0013948 A1 | 1/2016 | Moses | | |
| 2016/0086382 A1 | 3/2016 | Geisner et al. | | |
| 2016/0110782 A1 | 4/2016 | Tadajewski | | |
| 2016/0285793 A1 | 9/2016 | Anderson et al. | | |
| 2016/0309322 A1* | 10/2016 | Bohli | ............ | H04W 12/02 |
| 2017/0111770 A1* | 4/2017 | Kusens | ............ | G01S 1/68 |
| 2017/0308757 A1* | 10/2017 | Nguyen | ............ | H04L 12/4625 |
| 2017/0352250 A1* | 12/2017 | de Barros Chapiewski | ............ | |
| | | | | H04W 4/021 |
| 2019/0180040 A1* | 6/2019 | Marcel | ............ | G06F 21/6227 |

OTHER PUBLICATIONS

A. Schumann and R. Stiefelhagen, "Person Re-identification by Deep Learning Attribute—Complementary Information," 2017 IEEE Conference on Computer Vision and Pattern Recognition Workshops (CVPRW), Honolulu, HI, 2017, pp. 1435-1443, doi: 10.1109/CVPRW.2017.186. (Year: 2017).*

S. Puglisi, D. Rebollo-Monedero and J. Forné, "Potential Mass Surveillance and Privacy Violations in Proximity-Based Social Applications," 2015 IEEE Trustcom/BigDataSE/ISPA, 2015, pp. 1045-1052, doi: 10.1109/Trustcom.2015.481. (Year: 2015).*

"International Application Serial No. PCT US2017 063645, International Search Report dated Mar. 6, 2018", 3 pgs.

"International Application Serial No. PCT US2017 063645, Written Opinion dated Mar. 6, 2018", 6 pgs.

"Enhanced privacy ID (EPID)", Wikipedia, Accessed on Mar. 14, 2018 https://en.wikipedia.org/wiki/Enhanced_privacy_ID, (Dec. 14, 2017), 5 pgs.

Casey, Michael, "Facial recognition software is scanning you where you least expect it", CBS News, Accessed on Mar. 14, 2018 https://www.cbsnews.com/news/facial-recognition-software-is-scanning-you-where-you-least-expect-it/, (Jun. 25, 2015), 4 pgs.

* cited by examiner

OBJECT IDENTIFICATION FOR IMPROVED UX USING IOT NETWORK

TECHNICAL FIELD

An embodiment of the present subject matter relates generally to identifying objects in a scene to assist in locating objects and individuals, and, more specifically to, utilize Internet of Things (IoT) techniques and protocol to assist in object identification and localization.

BACKGROUND

Various mechanisms exist for identifying objects and people in a scene or environment. However, people still have difficulty both finding people in a crowd or large area. For instance, a group might be meeting for a hike, or to listening to live music at a venue, where members of the group are not all known to each other in advance. A group leader may alert the group to look for a red balloon, or meet everyone at the bar, or indicate that the leader will be wearing a red hat. But new members may continue to find it difficult to identify other members of the group, and therefore be discouraged from attending another event. Even good friends may have difficulty finding one another when one is not in the precise location that the other expects.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
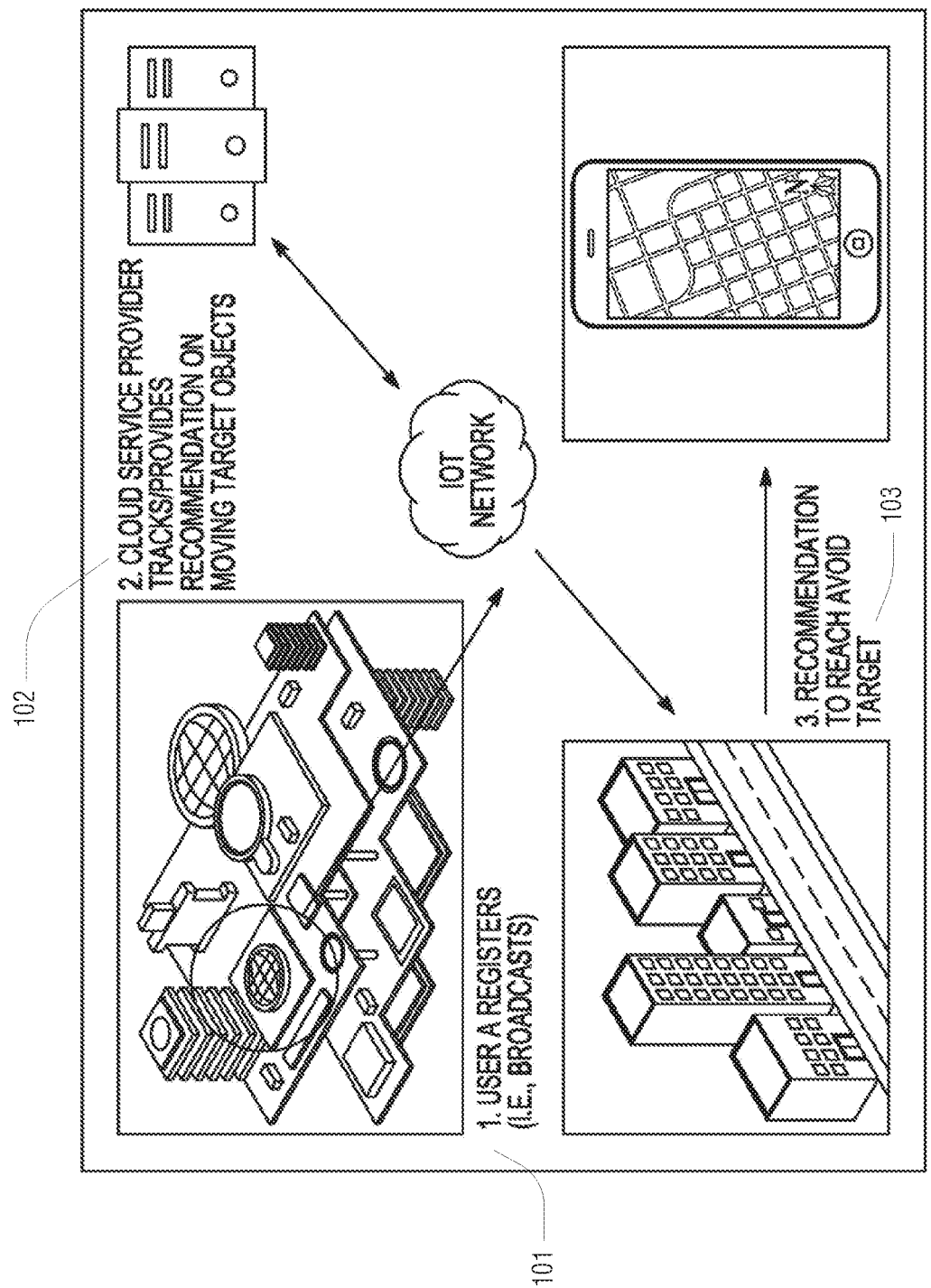
FIG. 1 is a block diagram illustrating high level flow for an object and individual tracking and identification system, according to an embodiment.

In the following description, for purposes of explanation, various details are set forth in order to provide a thorough understanding of some example embodiments. It will be apparent, however, to one skilled in the art that the present subject matter may be practiced without these specific details, or with slight alterations.

An embodiment of the present subject matter is a system and method relating to identifying objects in an environment or scene to assist in locating objects and individuals. In at least one embodiment, users register with a service over a network to help locate and/or track objects and individuals. The service may provide recommendations on how to locate, reach or avoid the target object or individual. Embodiments may be used for games, superior geo-caching, finding groups and individuals for meeting up, avoiding objects or individuals, etc.

In addition to the problem of finding an individual in a crowded room or large area, it can be difficult for people to avoid running into undesirable individuals. For instance, a person may want to avoid an ex-spouse, a bully, a past boss, etc. In some cases this desire to avoid is mutual, for instance when there is a protective order against contact, or just mutual animosity. Existing methods may be used for finding objects, for instance in geo-caching competitions. However, geo-caching typically uses GPS coordinates to help find an objects, and GPS is inexact, and prone to errors. Further, GPS satellites may be unavailable in some indoor environments, making it difficult to find an object by its GPS coordinates, especially when z-axis coordinates are involved (e.g., multiple level structure).

Embodiments described herein use visual images and markers to help locate and track objects and individuals for both finding and avoiding an individual. In an embodiment, an individual may be identified and tracked based on facial recognition. In another embodiment, the individual may be identified and tracked by an item of clothing or other object that is visible and moves with the individual, for instance, a hat, jewelry, badge, crutch, cane or walking stick, pocketbook, backpack, etc.

Reference in the specification to "one embodiment" or "an embodiment" means that a particular feature, structure or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment, or to mutually exclusive embodiments. Features of various embodiments may be combined in other embodiments.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

FIG. 1 is a block diagram illustrating high level flow for an object and individual tracking and identification system, according to an embodiment. User A registers with a cloud service at 101. User A may register for a game or personal tracking/avoidance request. User A may register personal preferences into a profile, such as, but not limited to: privacy preferences, guardian information for minors, identity authentication information, facial images, images of a target object to be kept with the user, a friend and/or foe list to identify who is permitted to find User A and who to avoid, etc. If User A wants to be found by another registered user, then User A may upload identifying visual information. This information may be a selfie image, or an official image taken by local camera connected to the cloud service, or a stock photo image, such as with a link to the user's cloud account or publicly available images on a registered social media site. User A may identify an object to use for tracking rather than a facial image. For instance, User A may upload images of a hat, backpack, badge, logo on a shirt, etc., to be tracked instead of using facial recognition. If User A wants to track another person or object, then User A identifies that which is to be tracked. For instance, User A may upload an image or point to a publicly available profile, or select an object in an image which should be tracked. User A may also identify a second registered user, and the tracking system (cloud service) may use images that the second user has identified may be tracked.

The cloud service provider may utilize sensor input from a variety of IoT devices, e.g., cameras, wearables, audio capture devices (e.g., microphones), etc., and tracks the target at 102. In an example, the target is User B, and the cloud has an image of User B to match with images taken from cameras in the environment. In an example, users enter an area which provide the tracking service, such as a shopping mall. In this example, the shopping mall will have cameras at various locations throughout. Images from these cameras will be sent to the cloud service in the shopping mall, or at a remote location and linked to the shopping mall. In an embodiment, the cloud service may also utilize images captured by other registered users in the area, for instance to get perspectives not available with stationary cameras, or to provide coverage to areas with non-functional cameras. When a user activates the tracking, these images will be compared against the target's image, whether it be a person's face or their hat or some object on their person.

Once the cloud service has acquired and is tracking the target, the service may send recommendations to the user (e.g., User A) who has requested the service, at 103. For instance in the example where User A is trying to find a group, the service may recommend walking directions for the user within the shopping mall to efficiently reach the group. In the case where User A desires to avoid a specific person, and that person's image has been uploaded as the target, this service may recommend that User A retreats, or turns left at the next hallway, or something similar, so that User A does not run into the target person.

In another example, the user requests to find or track a specific object. That object may have been registered with the service in a static or stable location. As long as the object remains immobile, then the cloud service may recommend an efficient path for the user to get to that object. In this case, visual images may not be required except as landmarks to help provide the user directions. In another example, the object may be a moving target, and tracked as described herein, as for objects connected with an individual. In this example, the Cloud service may provide real-time location/tracking of the target object and an updated path to reach/avoid the target.

In an embodiment, both the requesting user and the target user need to register with the service. If the cameras are located in a public place, many people who have not registered for this service may prefer to opt out of having their movements tracked. Due to privacy issues, in some cases, only authorized law enforcement personnel will be able to track all persons, including minors, without the person opting in. In another embodiment, a parent may want to be able to track their child through a shopping mall or amusement park or and other public place. So, the parents will register that child, as their guardian, and that child's face and/or wearable object will be uploaded to the service for tracking. However, the parents may authorize tracking only for specific authorized persons, for instance, the parents, grandparents, siblings and law enforcement personnel.

In an embodiment, one user may want to surprise another. If both users typically are registered to allow the other one to target them, one user may temporarily deactivate the search authorization. In this scenario, the user who deactivates search mode may locate and then surprise the other user. In another embodiment, users may disable location tracking of themselves when the other user deactivates location tracking, to avoid being surprised.

In another example, the system may be used in areas that have no stationary cameras, or very few of them, but instead have receiving devices for receiving images from registered users. For instance, in a ski resort, many skiers and snowboarders have helmet cameras for taking video of skiing or boarding down the hill. Other users take still images and video with cameras and smartphones. Many image capture devices (e.g., cameras) also capture time and location metadata which is electronically embedded in the images/video. When those users enter the resort area they may be asked to register their camera images. Registered users may periodically upload their video and images—either automatically or with a manual command—when they are in proximity of a receiving device, for instance mounted to a chairlift, at the base unit, or connected to a mountaintop restaurant, etc. In this way, lost skiers may be found more easily. In remote locations like ski areas, cellular towers may provide spotty or no signal for contacting people in your party who may have been lost. Thus, if the user wants to find a skier who has been lost for some time, they may register that user's image with the system and then the tracking may take place using images collected from other users. However, object identification may be a better option when skiers are wearing a lot of equipment on their faces, such as ski masks, partial ski masks, scarves, sunglasses, goggles, etc. In that case, facial recognition is may be nearly impossible. Thus, parties may desire to take images of people in their party in their ski gear, and then choose objects that may be tracked, for instance, helmets, hats, jackets, etc. If no images may be found to track the missing person, drones may be deployed in areas where no images were captured and uploaded. Thus, the search area may be narrowed to ignore areas where there were many images, but no images of the target.

In the case of avoiding another person or object, in an embodiment, both parties may need to register and the system will make recommendations for both of them to avoid each other. In another example, User A desires to avoid User B. In an example, User A does not want User B to know about the avoidance. In this case, User A may upload an image of User B to the service and request tracking of that person. In an embodiment, the service will track the target individual and make recommendations to the requester on how to avoid that person. The service may not identify the exact location of the target to User A when both parties have not opted in, for privacy purposes. Instead the service may only make recommendations on how to avoid the target.

In an embodiment, a directory storage server may be available that has indexes containing location and timestamp data for a library of images. A data aggregation engine, described more fully below, may have access only to the indexes until a search request is made. Some data locations may reside on a user device, where the user authorizes only limited use of the images. Attestation of the authorization for the data aggregation engine may be performed before access to the requested images is granted.

In an embodiment, User A may have a virtual reality (VR), augmented reality (AR) or mixed reality (MR) device such as a heads up display, or AR glasses. The directions, or path, to acquire or avoid the target may be provided to the user in the display unit. In an embodiment, directions may be provided visually as on a map, or they may be textual directions, or in a game they may be clues or hint. The map may be overlaid on the current scene being viewed by the user. In another embodiment, the user may be provided the recommendations via an audio device such as headphones, earbuds, hearing aid device, etc. In an embodiment the recommendations are provided to the user's smart phone or other mobile device, and the display or audio device via either Bluetooth®, near field communications, a localized Wi-Fi® or other communication method. In an embodiment, a User C may be remotely connected to Users A and B ambient IoT network, and guide Users A and B over a smartphone or other mobile device, via a voice call, text message or other communication method, on how to avoid/ meet the other person.

In an embodiment, the service area may be outdoors where there are not a lot of mounted cameras to acquire images of objects and individuals. In this case, drones may be deployed to take images of the surrounding area. A drone may be able to take many images in a short period of time and use them to assist identification and tracking of the target. In an embodiment, techniques as described herein may be used to assist in geocaching competitions. As discussed above, GPS coordinates used in geocaching may be inaccurate or partially inaccessible in an area. Images from cameras for drones or other sources may be used to assist in finding the object.

In an embodiment, a user may enter an area that provides this service and prefer to remain anonymous or unfound. In this case the user may upload an image of themselves and register with the service to remain anonymous. In this case that person will not be tracked or avoided as the system is analyzing images. In some cases where images are provided to users during tracking or identification perhaps in an AR display, the anonymous user's features may be pixelated or grayed out or randomized. In an embodiment, a user may be both anonymous and authorized to be found for specific users. For instance celebrities may desire to be anonymous from the paparazzi, but be accessible to friends who are trying to find them. In this case, the celebrity may be wearing sunglasses and a hat and obscuring their features so that normal facial recognition will not be able to find and track them. In that case they may register the hat that they are wearing, or sunglasses, or another object on their person, and upload that image to the system so that the authorized persons may find them. In an embodiment, authorizations may be permanent or temporary. An authorization may expire after a certain amount of time, or after the target is found the first or subsequent time.

In an embodiment, the user may be constrained to providing images taken from their camera using Intel® SGX, ARM® TrustZone® or other trusted execution environment (TEE) technology. This prevents a user from uploading an image of another person and claiming it is herself, and then authorizing that person to be found.

Figure 2:
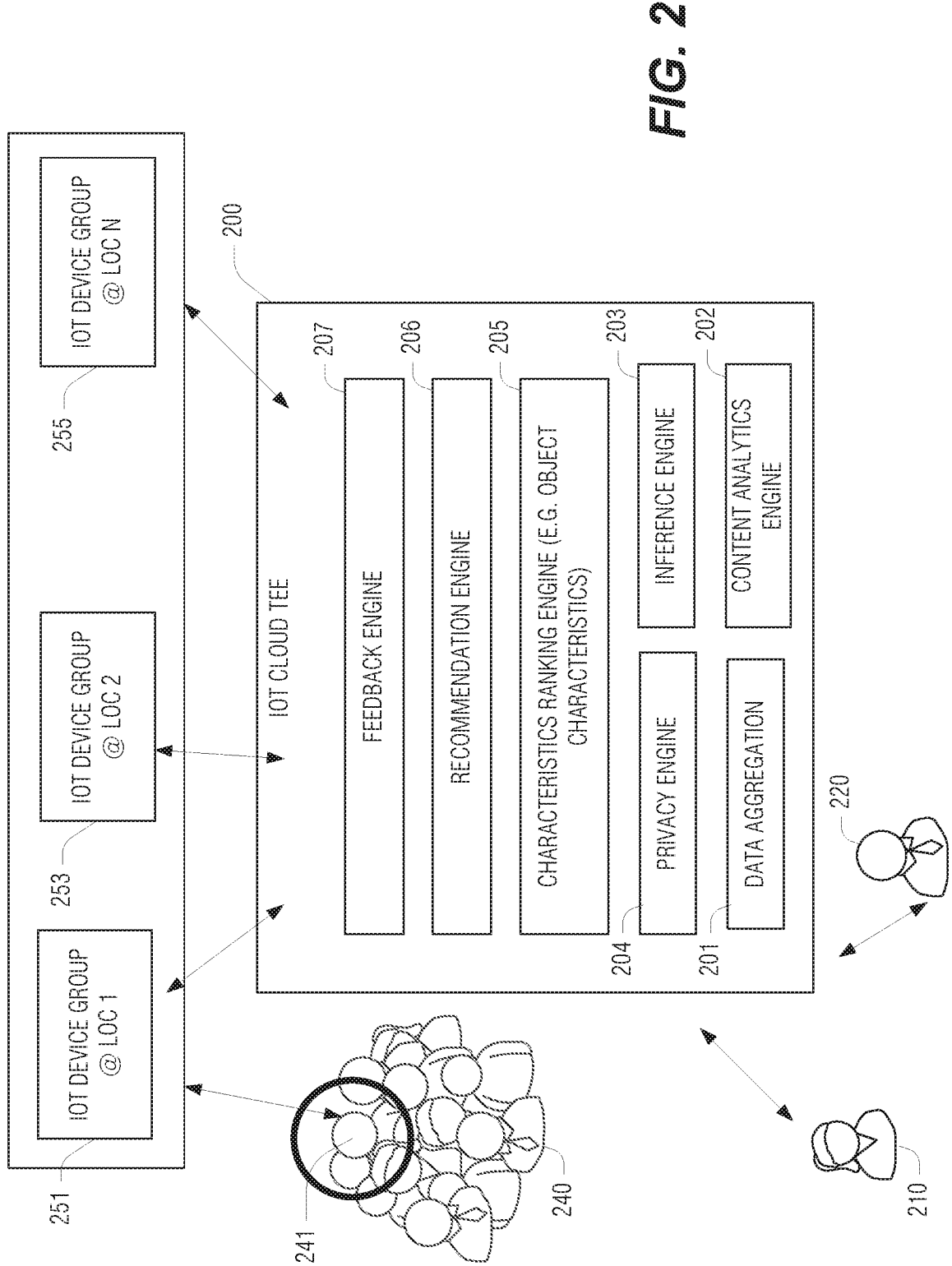
FIG. 2 is a block diagram illustrating an example embodiment, including an IoT trusted execution environment.

FIG. 2 is a block diagram illustrating an example embodiment, including an IoT trusted execution environment 200. In this example, User 210 has a mobile device that performs a quick discovery of IoT network service (e.g., cloud tracking service) as described herein. The mobile device performs remote attestation with the ambient IoT network. In an embodiment, a third user may connect remotely to the ambient IoT network of Users 210 and 220. The IoT network service may access myriad sensors, including audio, video, heat maps or thermal sensor, proximity, Wi-Fi®, etc. IoT sensors may be used for facial recognition, voice recognition, object recognition, etc. In an embodiment, the attestation may be performed using a platform trusted execution environment (TEE), such as TEE Intel® (SGX/CSME) or ARM® TrustZone®. Intel® Software Guard Extensions (Intel® SGX) is an Intel technology for application developers who are seeking to protect selected code and data from disclosure or modification. Intel® SGX makes such protections possible through the use of enclaves, which are protected areas of execution. Application code may be put into an enclave by special instructions and software made available to developers via the Intel® SGX Software Development Kit (SDK). The CSME (Converged Security Manageability Engine, Intel® CSME) is a portion of the firmware typically supplied by the system manufacturer with the boot firmware (e.g., basic input-output system (BIOS), unified extensible firmware interface (UEFI), etc.). The firmware uses a small portion of system memory (e.g., byte-addressable random access memory (RAM) such as static RAM (SRAM), dynamic RAM (DRAM), etc.) to extend services and performance while in S0 power state. When in other Sx power states, the Intel® CSME runs in its own SRAM. The CSME also has its own Flash storage area to hold the configuration settings along with other important data. User 210 takes a picture (e.g., selfie) of herself using a trusted device, such as Trusted Input RealSense™ Camera (e.g., Intel® RealSense™ Camera with SGX/CSME).

In an embodiment, User 210 may add any of the set of constraints detailed above (e.g. a landmark, a geo-fence, etc.) to the captured image securely, create a HASH of the data $\{User\_210\_Data\}_{HASH}$ and upload the result to the IoT network service. The IoT network service securely obtains and publishes the data to its IoT nodes (e.g. Camera's deployed at the shopping mall).

In this example, User 220 is looking for User 210, gets $\{User\ 210\_Data\}_{HASH}$ from User 210, and provides that to the IoT Service. IoT Discovery Service nodes perform object search/identification using $\{User\ 210\_Data\}_{HASH}$. Once User 210 is identified, the IoT Service provides a location, a direction, etc., in a tuple, to User 220, based on the current location of User 220. The service then provides an acknowledgement to User 210. Based on a dynamic geo-fence of User 220/User 210, the system keeps updating both User 220 and User 210.

As used above, $\{Data\_Token\}_{HASH}$ is a unique time bound token. The foregoing example illustrates user identification, but it may be scaled to any object search/identification in real-time. Platform TEE (e.g., Intel® SGX/CSME/ARM® TrustZone®) helps to provide necessary privacy/security. There may be many ways in which a user may verify their identity to assure the system that they are authorized to either register or search for an individual. For instance, in an embodiment, the TEE of the user device may perform attestation with the local/remote ambient IoT network service via s challenge/response protocol. Based on attestation of user device(s) and IoT network service, a unique time bound key for the current communication session may be derived. The user HASH may be encrypted and sent so that only the IoT service and other attested users may decrypt and view the content.

Embodiments may be used to assist in finding lost children or elderly or disabled persons in parks or other public places. A parent or guardian may be authorized to opt in for searches for the child or other person, for instance. There may be several levels of authorization required. For instance, a custodial parent may register the child as requiring the custodial parent's identification when the non-custodial parent may be a risk to the child. In some cases, the child or other person may be required to wear an identification device for a second level of authentication. The IoT network service may have RFID, or similar sensors in the area to acquire identification information in addition to visual images. If a secondary mode of identification is used, e.g., RFID, audio voice recognition, etc., then the visual search are may be narrowed down.

In an embodiment, the IoT cloud TEE 200 may include several different engines, processes, or components. The IoT cloud TEE 200 may also be referred to by its main component in discussion below, for simplicity. For instance, reference to the IoT network service is meant to refer to the collection of services executing in the cloud to effect the IoT environment, including the trusted execution components, but with specific focus on the components that act on IoT elements, as described herein. Reference to the IoT network may refer to the network infrastructure specific to IoT elements and protocols. The execution environment may include a data aggregation component 201, a content analytics engine 202, and inference engine 203, and a privacy engine 204. This system may also include a characteristics ranking engine (e.g., object characteristics) 205, a recommendation engine 206, and a feedback engine 207. The processes in the IoT cloud execution environment 200 may be communicatively coupled to different IoT device groups at different locations. For instance, the same cloud IoT service 200 may operate at location 1 (251), location 2 (253), and location N (255). For instance, in an example, location 1 (251) may be a first floor of a shopping mall and location 2 (253) may be a second floor of the same shopping mall. Location N (255) may be a city street area. Location 1 (251) may include images of a group of people 240. The target in this group may be 241.

Figure 3:
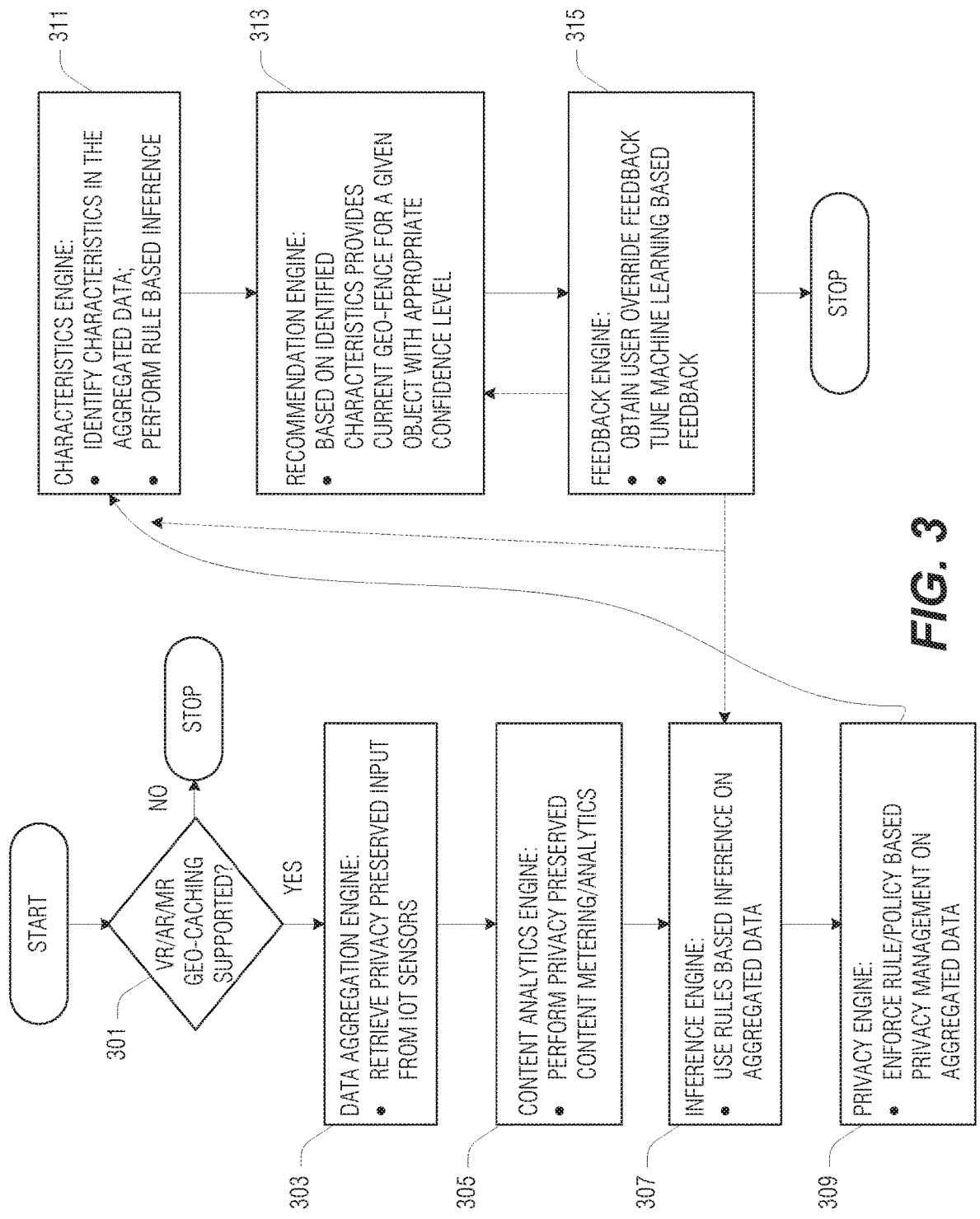
FIG. 3 illustrates an example flow diagram, according to an embodiment described herein.

FIG. 3 illustrates an example flow diagram, according to an embodiment described herein. When a user enters an area and desires to either find a target individual or group, play a game, or avoid an individual, the user may attempt to access the IoT service. A determination is made in block 301 as to whether this VR, AR or MR geocaching tracking and IoT device groups are supported for the target location. The user's location is received and a determination is made as to whether the user is in a location that supports this system. If not, then the process stops and the user cannot use the service. If the service is available, then a data aggregation engine may be used to retrieve privacy preserved input from the IoT sensors in block 303. Privacy preservation may be performed with the help of a TEE and associated configured privacy policies. For example, if a privacy policy dictates storage of user pictures is not allowed, the TEE will guarantee that this rule is enforced. Rule based privacy may be extended to other user attributes, such as voice, facial features, demographic information, etc. Example policies may include: a requirement to process information in specific geographic region (e.g., USA for U.S. Government data or health data); do not allow local storage; sanitize memory/purge data as soon as possible; remove personal sensitive information before sharing/archiving; etc. The data aggregation engine is a component that aggregates data from a variety of input sources. Input sources may include, but are not limited to, IoT sensing devices such as cameras, microphones, heat maps, proximity sensors, RFID readers, access point Wi-Fi® devices, etc., deployed in a given specific geographical location (geo). The aggregation engine may be communicatively coupled with the variety of input sources via an IP network to aggregate data. Data aggregation policies (sampling interval, announcement interval, etc.) may be configurable with respect to a given specific geofence. Machine learning may be used on the cloud in either supervised or unsupervised modes to make the IoT devices smarter by learning during the acquisition and searching processes. Cloud processes may aggregate the data from users, as well as IoT data from sensors.

A content analytics engine may then perform a privacy preserved content metering or analytics in block 305. The content analytics engine is a component that performs rule-based analysis using trained or un-trained models that will be used by the inference engine for object identification. Content analytics may identify when a located individual or object is moving by analyzing subsequent images, and a pace of target movement based on inertial sensing, direction of target movement, after the initial acquisition of the individual/object.

An inference engine may use the rule-based inference on the aggregated data used with machine learning algorithms, in block 307. The inference engine component is used to identify the characteristics in the aggregated data. The inference engine performs rule based inference by correlating the data across various sources. For instance, the inference engine may use predictive analysis based on coordinates of the tracked individual/object and fast learning techniques to predict where/which direction the individual/object is moving. For instance, predictive analysis may be based on current coordinates of the target, learned past movement of the target, and learned past pace of the target. This prediction may be used to help focus attention on the predicted area to reacquire a moving target. The inference engine identifies using the raw data, rules, user opt-in preferences, etc. (e.g., multi-sensor assertion based). In case of any conflict of sensor assertion, the inference engine may use rule based logic to resolve them. As an example, in some scenarios, the lowest common denominator may be taken or an assertion score may be assigned to sensors based on their confidence of assertions in the past.

The feedback engine 315, discussed more fully below, may allow users to provide inputs for better machine learning convergence. In an example with three users, for instance, each user may be searching for an object or individual, or more simply, a target. If a first user see the target at some distance, the first user may create a virtual marker with a geographic indicator and time stamp, to associate with the target. This enables the IoT network service to narrow down the search area when other users search for the target.

Feedback may be implemented with a dialogue-based approach, or protocol, between the IoT network service and participating users in the search. Using the dialogue capability, users may also provide feedback regarding the belief that the IoT service machine learning needs to be improved, because of incorrect response, for example, the recommendation may have shown a target moving east when the target really was really moving north. Feedback such as the system got confused with another user with similar signature, may be required, as well. Such a dialogue-based approach may translate into a negotiation between the participating user(s) and the IoT service in terms of narrowing down the search for target or in changing the target characteristics dynamically based on observations. For example, a target under search may change her costume/hair style (to avoid being identified). With the negotiation capability, a user identifying the new outlook of the target may provide hints to the IoT service, or the IoT network service may request feedback based on a target only tentatively identified, due to a slight variations in characteristics. Based on user(s) inputs, IoT service may alter recommendation and get additional user feedback/inputs to improve IoT service visual understanding and machine learning convergence.

A privacy engine may enforce rules and policy-based privacy management on the aggregated data in block 309. The privacy engine may be used to protect user identity.

Users may opt-in to allow their devices to exchange challenge/response with the IoT system to generate One-Time-Unique-HASH (OTUH) that is valid for specific period of time. The system may preserve privacy of data using security technologies such as Intel® SGX and Intel® EPID (enhanced privacy ID), available from Intel Corporation.

The privacy engine may use keys during a handshake process with users, during registration and location/avoidance requests. The privacy engine may also control the data stored on servers in the cloud, for instance, using encryption, to protect private data. Users may opt-in or configure their preference(s) for privacy/security.

A characteristics engine may identify characteristics in the aggregated data and perform rule-based inference, in block 311. The characteristics ranking engine ranks the identified characteristics of the content. One example of a characteristic item, but not limited to, is facial fiducial points. Other characteristics may be clothing, or a uniform, for instance, if the individual target is on a sports team. Based on various characteristics chosen in a given sample interval, this engine may be able to sort/rank characteristics. Ranking may be based on demographic information, time sampling when the individual appeared in an image frame. Ranking policies may be user or administrator selected, based on the application.

A recommendation engine may provide current geo-fence information for a given object with an appropriate confidence level, based on the identified characteristics, in block 313. The recommendation engine may, based on the ranking of characteristics from a ranking engine, provide appropriate recommendations to content delivery subsystem. Recommendations may be configured by a user during registration process. This registration may be by using audio, video, VR/AR/MR, preferred language, etc. The recommendation engine may receive active feedback information from users. For instance, the target individual may send information about objects that the user is holding or wearing to provide additional identifying characteristics. The recommendation may identify a top ten matches, and then use the feedback information to narrow them down. The recommendation engine may provide the path to (or away) from the target via visual, audio or AR methods, as discussed above.

A feedback engine may obtain user override feedback or tune machine learning based on feedback, in block 315. Based on adaptive feedback received from the variety of input sources, the recommendation engine may provide alternate options. The feedback engine may assist in dynamic recommendations. The recommendation engine may learn where a user frequently visits, and may use predictive analysis to guess that the user is heading toward one of these frequently visited locations. The feedback engine may query either party for confirmation or with suggestions. In an embodiment, the feedback engine may receive information from a user that the directions were wrong, or the object or person identified was incorrect, or that they were directed to the wrong level of the shopping mall, etc.

On the client side, for instance in an application on the user's mobile device, the client service application may use a structured input/output protocol, as available from Intel Corp.

Figure 4:
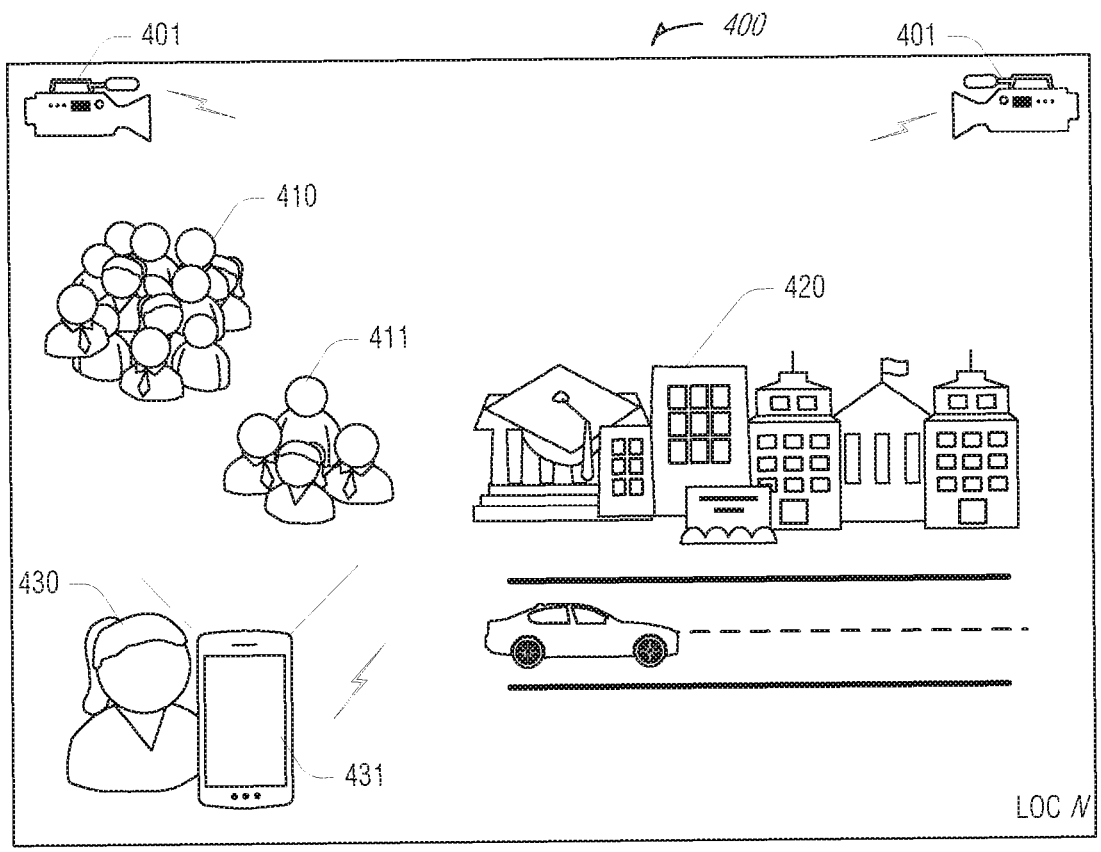
FIG. 4 illustrates an environment which may be used with embodiments described herein.
Figure 4:
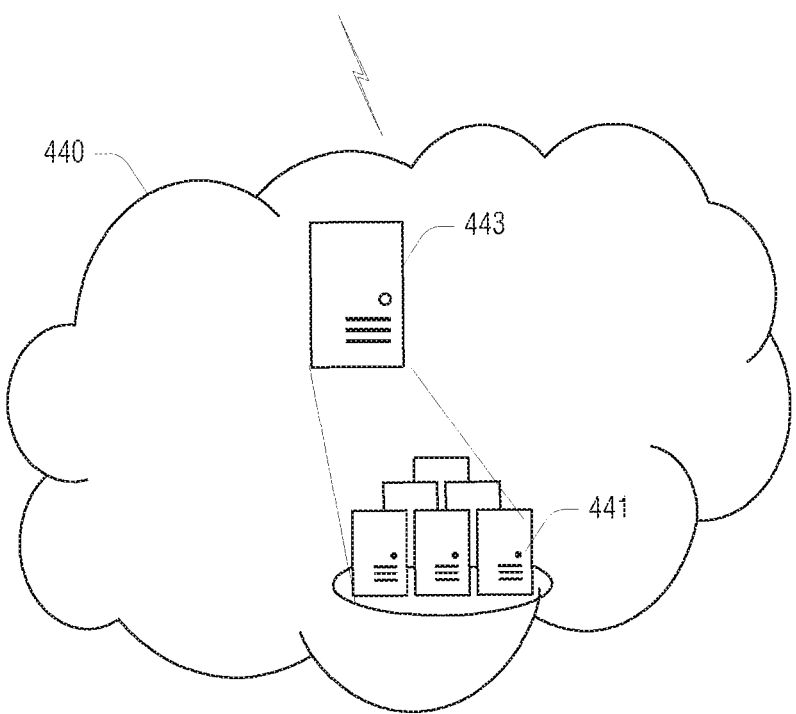

FIG. 4 illustrates an environment 400 which may be used with embodiments described herein. In this example the environment shows a city street 420 where there are various groups of people 410 and 411 within the environment 400. Cameras 401 may be conveniently placed throughout the environment 400 for capturing video or still images. User 430 may be in the environment 400 and have a mobile device 431 which may communicate to the cloud 440, as well as have capture components such as a camera and microphone that may capture images and audio from the environment 400. In an example, user 430 wants to locate an individual within the environment 400. The user communicates with a data center or cloud provider 441. The cloud provider 441 may utilize a server 443 which may access images, audio, IoT sensor data, object characteristics, and other information from environment 400. In an embodiment, the cloud provider 441 and server 443 may be in the same or different geographical region or network. The mobile device 431 may include a navigation system or other application to assist with navigating to the individual or objects. Mobile device 431 may also include an application for registering the user 430 to the cloud service 441, where the registration component is capable of authenticating the user 430 for secure and private usage of the service.

In an embodiment, a collection, or swarm, of drones may be deployed as a temporary IoT network, for example, where there is no cellular or other wireless connectivity. An example use case may be for a bicycle or running relay/marathon race where users travel through remote areas with no cellular or other wireless connectivity. The swarm of drones may operate as the IoT service provider and connect to users who wish to track/avoid objects/individuals.

Figure 5:
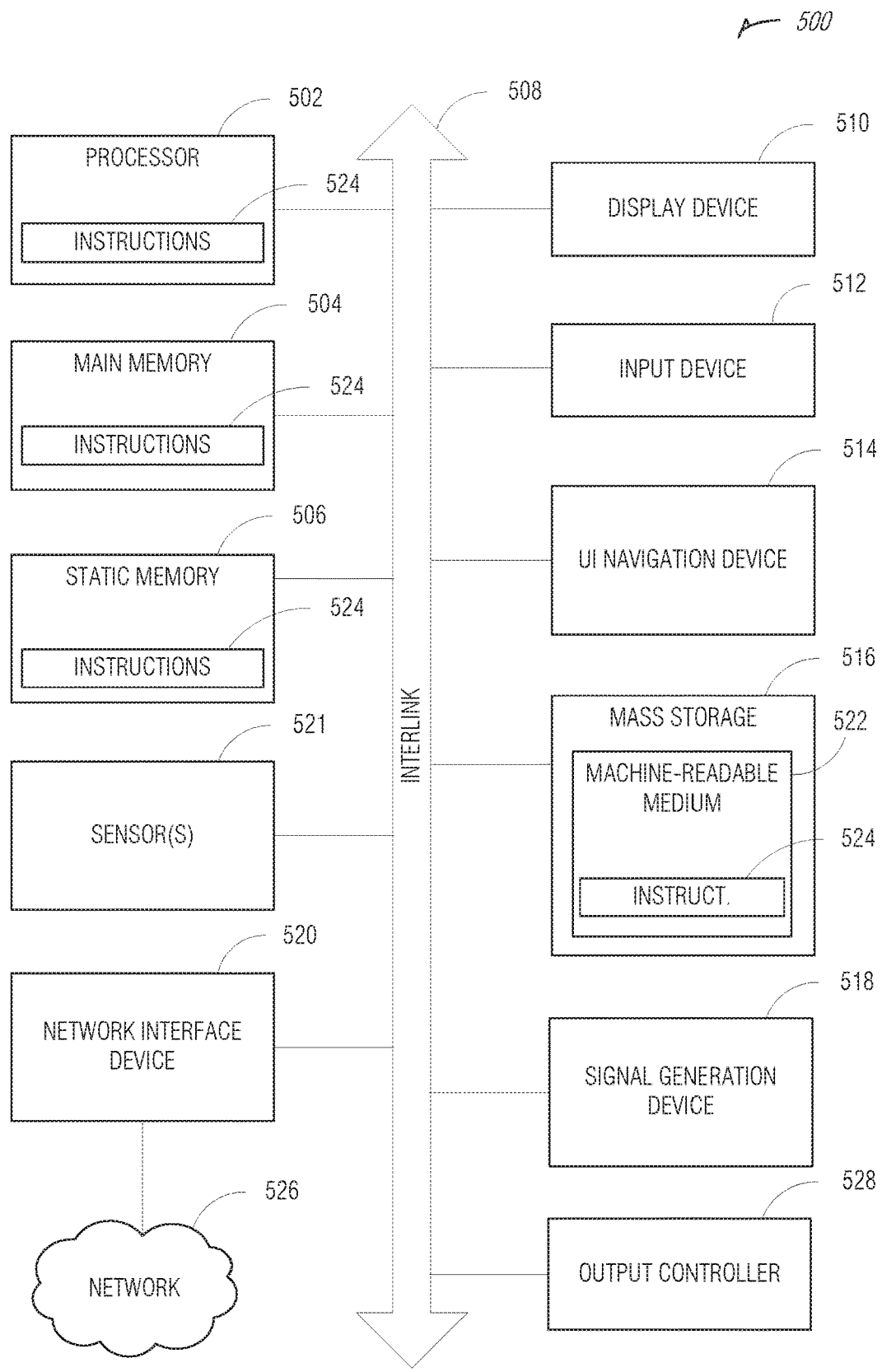
FIG. 5 is a block diagram illustrating an example of a machine upon which one or more embodiments may be implemented.

FIG. 5 is a block diagram illustrating an example of a machine 500 upon which any one or more of the techniques (e.g., methodologies) discussed herein may be performed. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

ADDITIONAL NOTES AND EXAMPLES

Examples may include subject matter such as a method, means for performing acts of the method, at least one machine-readable medium including instructions that, when performed by a machine cause the machine to performs acts of the method, or of an apparatus or system for privacy preserved object identification (PPOI) for improved user experience using IoT network services, according to embodiments and examples described herein.

Example 1 is a system for tracking target objects, comprising: a registration component, when in operation communicatively coupled to a cloud service provider, to register user preferences regarding privacy and authorizations of tracking at least one of an object or a user by the cloud service provider; a tracking component, when in operation communicatively coupled to the cloud service provider, to aggregate data received from a plurality of sensors, and to identify a target in the aggregated data, and to detect movement of the target based on the aggregated data; and a recommendation engine to provide information regarding location or avoidance of the target to a registered user, based on privacy and authorization preferences registered by the registration component.

In Example 2, the subject matter of Example 1 optionally includes wherein the system is to operate in a trusted execution environment.

In Example 3, the subject matter of Example 2 optionally includes a content analytics engine to perform rule-based analysis on content models and after acquisition of the target, to analyze subsequent images to identify when the target is moving.

In Example 4, the subject matter of Example 3 optionally includes wherein the content analytics engine is to utilize techniques in visual understanding and scene understanding to provide object identification and tracking.

In Example 5, the subject matter of any one or more of Examples 3-4 optionally include an inference engine to perform rule-based inference on the aggregated data used with machine learning algorithms, wherein the inference engine is to identify characteristics in the aggregated data, and to correlate data across various sources of data.

In Example 6, the subject matter of Example 5 optionally includes wherein the inference engine is to perform predictive analysis based on coordinates of the target and use fast learning techniques to predict where the target is moving.

In Example 7, the subject matter of any one or more of Examples 2-6 optionally include a privacy engine to use one time unique hash protocol in a challenge/response exchange between a user and the cloud service provider to protect an identity of the user and user-specific data.

In Example 8, the subject matter of Example 7 optionally includes wherein the one time unique hash is set to be valid for a limited period of time.

In Example 9, the subject matter of any one or more of Examples 2-8 optionally include a privacy engine to control user-specific private data stored on servers accessible to the cloud service provider, the user-specific private data to be encrypted when encryption is requested in the user preferences.

In Example 10, the subject matter of any one or more of Examples 2-9 optionally include a characteristics ranking engine to perform rule-based inference to rank identified characteristics in the aggregated data received from a plurality of sensors.

In Example 11, the subject matter of Example 10 optionally includes wherein characteristics include facial fiducial points retrieved from image data in the aggregated data and identification of clothing corresponding to the target, and wherein ranking is based on demographic information, and time sampling when the target appeared in an image frame in the aggregated data, and wherein ranking policies are pre-selected by at least one of a user and an administrator of the cloud service provider.

In Example 12, the subject matter of any one or more of Examples 2-11 optionally include a feedback engine to accept feedback from users of the cloud service, wherein a user is one of a requesting user or a target individual, and wherein the feedback engine is to query the user for at least one of confirmation of location, confirmation of identification, or accuracy of information received from the recommendation engine.

In Example 13, the subject matter of any one or more of Examples 2-12 optionally include wherein the feedback engine is to use a dialogue-based communication protocol, including negotiation, between the user and the cloud service.

In Example 14, the subject matter of any one or more of Examples 1-13 optionally include wherein the plurality of sensors comprise at least one of an image capture device, an audio capture device, a thermal sensor, a proximity sensor, and an RF sensor.

In Example 15, the subject matter of Example 14 optionally includes wherein the tracking component further comprises a voice recognition component to receive audio and identify a target individual based on received vocal audio.

In Example 16, the subject matter of any one or more of Examples 14-15 optionally include wherein the tracking component further comprises an object recognition component to receive information identifying a target object, and to receive criteria for locating and tracking the target object, wherein the object is to remain in close proximity with a target individual.

In Example 17, the subject matter of Example 16 optionally includes wherein the tracking component is further to confirm identification of the target individual based on identification of the target object, and is to use facial recognition to identify facial features of the target individual in images received from an image capture device, and to determine that the target individual has been located.

In Example 18, the subject matter of any one or more of Examples 14-17 optionally include wherein the tracking component further comprises a facial recognition component to identify facial features of a target individual in images received from an image capture device, and wherein the tracking component is to determine that the target individual has been located.

In Example 19, the subject matter of any one or more of Examples 1-18 optionally include wherein the target is one of a target object and a target individual.

Example 20 is a computer implemented method for locating and tracking objects, comprising: aggregating data to identify an object in a supported device group location, the data from a plurality of sensors communicatively coupled to a service running in a trusted execution environment; and applying user preferences regarding privacy and authorizations for tracking the object to identify whether location and tracking information related to the object are to be released to a user requesting the information.

In Example 21, the subject matter of Example 20 optionally includes wherein the user preferences define a temporal authorization period for releasing the information to the user requesting the information.

In Example 22, the subject matter of any one or more of Examples 20-21 optionally include registering with the service, by the user requesting the information, wherein the registering of the user includes authenticating the user for secure and private usage of the service; and registering with the service a target individual corresponding to the object, wherein the registering of the target individual includes: correlating the object to the target individual, identifying that the object may be tracked by the user for a specific time period, and identifying privacy restrictions on releasing data corresponding to the target individual.

Example 23 is a system for locating and tracking objects, comprising means for performing the method of any of Examples 20-22.

Example 24 is at least one computer readable storage medium having instructions stored thereon, the instructions when executed on a machine cause the machine to perform the method of any of Examples 20-22.

Example 25 is at least one computer readable storage medium having instructions stored thereon, the instructions when executed on a machine cause the machine to: access data, the data collected by a plurality of sensors communicatively coupled to a service running in a trusted execution environment; aggregate the data to identify an object in a supported device group location; and apply user preferences regarding privacy and authorizations for tracking the object to identify whether location and tracking information related to the object are to be released to a user requesting the information.

In Example 26, the subject matter of Example 25 optionally includes wherein the user preferences define a temporal authorization period for releasing the information to the user requesting the information.

In Example 27, the subject matter of any one or more of Examples 25-26 optionally include instructions to: register with the service, by the user requesting the information, wherein the registering of the user includes authenticating the user for secure and private usage of the service; and register with the service a target individual corresponding to the object, wherein the registering of the target individual includes instructions to: correlate the object to the target individual, identify that the object may be tracked by the user for a specific time period, and identify privacy restrictions on releasing data corresponding to the target individual.

Example 28 is a device for locating objects, comprising: a mobile device, when in operation, communicatively coupled to a cloud service provider for locating and tracking an object; an image capture assembly coupled to the mobile device to capture images of an environment proximate to the mobile device; a location identification unit to identify a location corresponding to the mobile device; a display unit coupled to the mobile device to display recommendations corresponding to the object, object location and location of the mobile device; and a privacy engine coupled to the mobile device to authenticate a user of the mobile device to the cloud service, and to provide user preferences regarding privacy and authorizations to the cloud service provider.

In Example 29, the subject matter of Example 28 optionally includes wherein the display unit is to display map directions indicating a path to take to either meet or avoid the object.

In Example 30, the subject matter of any one or more of Examples 28-29 optionally include an audio output to provide audio instructions corresponding with the recommendation.

In Example 31, the subject matter of any one or more of Examples 28-30 optionally include wherein the image capture assembly is further to capture an image of the user, and to forward the image of the user to the privacy engine for use in authenticating the a user.

Example 32 is a system for locating and tracking objects, comprising: means for receiving data from a plurality of sensors communicatively coupled to a service running in a trusted execution environment; means for aggregating the data received to identify an object in a supported device group location; and means for applying user preferences regarding privacy and authorizations for tracking the object to identify whether location and tracking information related to the object are to be released to a user requesting the information.

In Example 33, the subject matter of Example 32 optionally includes wherein the user preferences define a temporal authorization period for releasing the information to the user requesting the information.

In Example 34, the subject matter of any one or more of Examples 32-33 optionally include means for registering with the service, by the user requesting the information, wherein the means for registering of the user includes means for authenticating the user for secure and private usage of the service; and means for registering with the service a target individual corresponding to the object, wherein the means for registering of the target individual includes: means for correlating the object to the target individual, means for identifying that the object may be tracked by the user for a specific time period, and means for identifying privacy restrictions on releasing data corresponding to the target individual.

Example 35 is a system configured to perform operations of any one or more of Examples 1-34.

Example 36 is a method for performing operations of any one or more of Examples 1-34.

Example 37 is a at least one machine readable storage medium including instructions that, when executed by a machine cause the machine to perform the operations of any one or more of Examples 1-34.

Example 38 is a system comprising means for performing the operations of any one or more of Examples 1-34.

The techniques described herein are not limited to any particular hardware or software configuration; they may find applicability in any computing, consumer electronics, or processing environment. The techniques may be implemented in hardware, software, firmware or a combination, resulting in logic or circuitry which supports execution or performance of embodiments described herein.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural, declarative, and/or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product, also described as a computer or machine accessible or readable medium that may include one or more machine accessible storage media having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, smart phones, mobile Internet devices, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter may be practiced with various computer system configurations, including multiprocessor or multiple-core processor systems, minicomputers, mainframe computers, as well as pervasive or miniature computers or processors that may be embedded into virtually any device. Embodiments of the disclosed subject matter may also be practiced in distributed computing environments, cloud environments, peer-to-peer or networked microservices, where tasks or portions thereof may be performed by remote processing devices that are linked through a communications network.

A processor subsystem may be used to execute the instruction on the machine-readable or machine accessible media. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

Examples, as described herein, may include, or may operate on, circuitry, logic or a number of components, modules, or mechanisms. Modules may be hardware, software, or firmware communicatively coupled to one or more processors in order to carry out the operations described herein. It will be understood that the modules or logic may be implemented in a hardware component or device, software or firmware running on one or more processors, or a combination. The modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures. As such, modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured, arranged or adapted by using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

While this subject matter has been described with reference to illustrative embodiments, this description is not intended to be construed in a limiting or restrictive sense. For example, the above-described examples (or one or more aspects thereof) may be used in combination with others. Other embodiments may be used, such as will be understood by one of ordinary skill in the art upon reviewing the disclosure herein. The Abstract is to allow the reader to quickly discover the nature of the technical disclosure. However, the Abstract is submitted with the understanding that it will not be used to interpret or limit the scope or meaning of the claims.

What is claimed is:

1. A system for tracking target objects, comprising:
    processing circuitry to implement:
        a registration component, when in operation communicatively coupled to a cloud service provider, to register user preferences of a first registered user regarding privacy and authorizations of tracking the first registered user by the cloud service provider based on an object worn by the first registered user on or over a head or face of the first registered user, wherein the object is identified in an image uploaded to the registration component by the first registered user;
        a tracking component, when in operation communicatively coupled to the cloud service provider, to aggregate data received from a plurality of sensors in an environment, and to identify a target in the aggregated data based on the identification of the object identified in the image uploaded to the registration component, and to detect movement of the target within the environment based on the aggregated data, wherein the plurality of sensors comprise cameras distributed throughout the environment; and
        a recommendation engine to provide information regarding including a path or directions to avoid the target, without providing the location of the target to a second registered user, based on privacy and authorization preferences registered by the registration component.

2. The system as recited in claim 1, wherein the system is to operate in a trusted execution environment.

3. The system as recited in claim 2, wherein the processing circuitry is to implement:
a content analytics engine to perform rule-based analysis on content models and after acquisition of the target, to analyze subsequent images to identify when the target is moving.

4. The system as recited in claim 3, wherein the content analytics engine is to utilize techniques in visual understanding and scene understanding to provide object identification and tracking.

5. The system as recited in claim 3, wherein the processing circuitry is to implement:
an inference engine to perform rule-based inference on the aggregated data used with machine learning algorithms, wherein the inference engine is to identify characteristics in the aggregated data, and to correlate data across various sources of data.

6. The system as recited in claim 5, wherein the inference engine is to perform predictive analysis based on coordinates of the target and use fast learning techniques to predict where the target is moving.

7. The system as recited in claim 2, wherein the processing circuitry is to implement a privacy engine to use one time unique hash protocol in a challenge/response exchange between a user and the cloud service provider to protect an identity of the user and user-specific data.

8. The system as recited in claim 7, wherein the one time unique hash is set to be valid for a limited period of time.

9. The system as recited in claim 2, wherein the processing circuitry is to implement a privacy engine to control user-specific private data stored on servers accessible to the cloud service provider, the user-specific private data to be encrypted when encryption is requested in the user preferences.

10. The system as recited in claim 2, wherein the processing circuitry is to implement a characteristics ranking engine to perform rule-based inference to rank identified characteristics in the aggregated data received from a plurality of sensors.

11. The system as recited in claim 10, wherein characteristics include facial fiducial points retrieved from image data in the aggregated data and identification of clothing corresponding to the target, and wherein ranking is based on demographic information, and time sampling when the target appeared in an image frame in the aggregated data, and wherein ranking policies are pre-selected by at least one of a user and an administrator of the cloud service provider.

12. The system as recited in claim 2, wherein the processing circuitry is to implement a feedback engine to accept feedback from users of the cloud service, wherein a user is one of a requesting user or a target individual, and wherein the feedback engine is to query the user for at least one of confirmation of location, confirmation of identification, or accuracy of information received from the recommendation engine.

13. The system as recited in claim 12, wherein the feedback engine is to use a dialogue-based communication protocol, including negotiation, between the user and the cloud service.

14. The system as recited in c II wherein the tracking component further comprises a voice recognition component to receive audio and identify a target individual based on received vocal audio.

15. The system as recited in claim 1, wherein the tracking component further comprises an object recognition component to receive information identifying a target object, and to receive criteria for locating and tracking the target object, wherein the object is to remain in close proximity with a target individual.

16. The system as recited in claim 1, wherein the tracking component further comprises a facial recognition component to identify facial features of a target individual in images received from an image capture device, and wherein the tracking component, is to determine that the target individual has been located.

17. The system of claim 1, wherein the user preferences include tracking permissions including who is able to track the first registered user, and the processing circuitry selectively enables the tracking based on the permissions.

18. A computer implemented method for locating and tracking objects, comprising:
receiving data from a plurality of sensors communicatively coupled to a service running in a trusted execution environment, wherein the plurality of sensors comprise cameras distributed throughout, an environment;
aggregating the data received to identify an object in a supported device group location, wherein the object is identified in an image uploaded to the service by a first registered user of the service, the object worn by the first registered user on or over a head or face of the first registered user; and
applying user preferences regarding privacy and authorizations of the first registered user, for tracking the object to provide a path or directions to avoid the first registered user without providing the location of the first registered user to a second registered user requesting the information.

19. The computer implemented method as recited in claim 18, wherein the user preferences define a temporal authorization period for releasing the information to the user requesting the information.

20. The computer implemented method as recited in claim 18, further comprising:
registering with the service, by the user requesting the information, wherein the registering of the user includes authenticating the user for secure and private usage of the service; and
registering with the service a target individual corresponding to the object, wherein the registering of the target individual includes:
correlating the object to the target individual,
identifying that the object may be tracked by the user for a specific time period, and
identifying privacy restrictions on releasing data corresponding to the target individual.

21. The computer implemented method as recited in claim 18, wherein the user preferences include tracking permissions including who is able to track the first registered user, and the method comprises selectively enabling the tracking based on the permissions.

22. At least one non-transitory computer readable storage medium having instructions stored thereon, the instructions when executed on a machine cause the machine to:
aggregate data to identify an object in a supported device group location, the data from a plurality of sensors communicatively coupled to a service running in a trusted execution environment, wherein the object is identified in an image uploaded to the service by a first registered user of the service, the object, worn by the first, registered user on or over a head or face of the first registered user, and wherein the plurality of sensors comprise cameras distributed throughout a monitored environment; and apply user preferences regarding privacy and authorizations of the first registered user, for tracking the object to provide a path or directions to avoid the first registered user, without providing the location of the first registered user to a second registered user requesting the information.

23. The at least one non-transitory computer readable storage medium as recited in claim 22, wherein the user preferences define a temporal authorization period for releasing the information to the user requesting the information.

24. The at least one non-transitory computer readable storage medium as recited in claim 22, further comprising instructions to:

register with the service, by the user requesting the information, wherein the registering of the user includes authenticating the user for secure and private usage of the service; and register with the service a target individual corresponding to the object, wherein the registering of the target individual includes instructions to:

correlate the object to the target individual, identify that the object may be tracked by the user for a specific time period, and identify privacy restrictions on releasing data corresponding to the target individual.

25. The at least one non-transitory computer readable storage medium as recited in claim 22, wherein the user preferences include tracking permissions including who is able to track the first registered user, and the instructions cause the machine to selectively enable the tracking based on the permissions.

* * * * *